Jan. 12, 1971 W. M. MOORE 3,555,526

MEMORY PLANE WITH INTERCHANGEABLE COMPONENTS

Filed Feb. 6, 1968

INVENTOR.
WALTER M. MOORE

BY Frank R. Trifari

AGENT

United States Patent Office 3,555,526
Patented Jan. 12, 1971

3,555,526
MEMORY PLANE WITH INTERCHANGEABLE COMPONENTS

Walter M. Moore, Saugerties, N.Y., assignor to Ferroxcube Corporation, Saugerties, N.Y., a corporation of Delaware Filed Feb. 6, 1968, Ser. No. 703,294
Int. Cl. G11c 5/04, 7/04
U.S. Cl. 340—174 4 Claims

ABSTRACT OF THE DISCLOSURE

A core plane frame for magnetic core memories in which several basic frame components are incorporated for use with a plurality of magnetic core sizes to form a variety of frame sizes. The frame components are metal thereby providing a frame which is an excellent heat sink. Insulated terminals are supported thereon for soldering to terminals on adjacent frames when the frames are stacked to form memory arrays.

Figure 1:
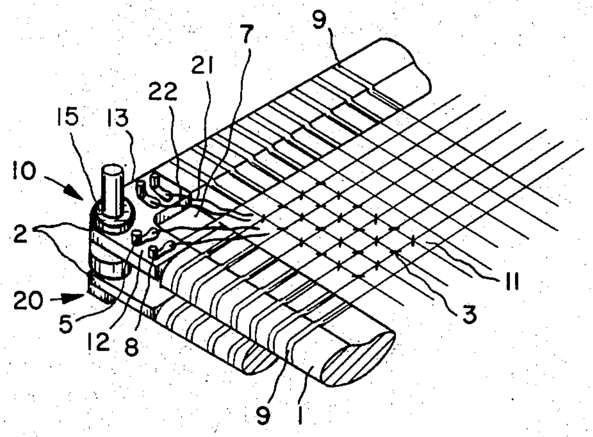

The invention relates to core plane frames for information storage of core memory matrices of the type comprising a plurality of apertured magnetic cores having two or more conductors passing therethrough. The magnetic cores are arranged in a number of parallel rows and parallel columns. An X directional drive wire passes through the cores of each row and a Y directional drive wire passes through the cores of each column. A sense and a bias wire may also pass through the cores. The sense wire passes through the cores along a diagonal and the bias wire passes through the cores parallel either to the X or Y wire. The wires are secured to terminals mounted on the core plane frame which surrounds the matrix.

The expanding utilization of digital computers in extreme environments of temperature, vibration and shock has created a demand for core memory storage systems which are stronger and more reliable without requiring an increase in size and complexity or a reduction of storage and high-speed random access capabilities. Core plane frames in existing memory arrays have used bulky structural components in order to operate in environments where extreme shock and vibration occurs. Fans for moving air through the magnetic cores or submerging magnetic cores into a coolant are two of the more widely used methods for removing heat generated by the switching of magnetic cores and thereby reducing the high temperature in the area surrounding the cores.

These above-noted specific applications, plus other variables such as magnetic core size or the number of magnetic matrices to be incorporated required a specific and distinct core plane frame design for each application or variable. The utilization of a large number of core plane frame designs results in substantial manufacturing costs, supply and stocking costs, as well as resulting in the creation of an extreme penalty for change or obsolescence. The penalty for change or obsolescence occurs because of the substantial cost in modifying or scrapping the many frame designs.

Another significant deficiency also exists in the core plane frames which are currently available. In forming a memory array the individual X, Y, sense and bias wires on each core plane frame must be attached to a corresponding X, Y, sense and bias wire on each adjacent core plane frame when the frames are stacked to form an array. This attachment is accomplished by terminating each of the wires at a terminal positioned on one of the frame sides and interconnecting corresponding terminals on adjacent core plane frames by bus bars or the equivalent. The bus bar is either crimped or soldered to each terminal. The connections of the bus bars to the terminals is primarily a manual operation and hence the connections are subject to numerous assembly errors. Since these connections must be both strong and reliable due to their particular vulnerability to shock and vibration, rigorous and costly quality control procedures must be incorporated.

According to the invention a metal core plane frame is provided which includes a plurality of interchangeable components including a metal plate for supporting the magnetic cores which has excellent heat transfer characteristics, vibration and shock resistance, and is readily assembled into a memory area. The interchangeable components comprise a uniform corner member, a plurality of variable length frame sides, a uniform joint member for interconnecting aligned frame sides, and the previously described metal plate for supporting and providing a magnetic reference for the core matrices retained by a core plane frame. A multiplicity of core plane frames conforming with the varied requirements of memory array applications can be fabricated by a proper choice of the above listed components. The terminals for receiving the X, Y, sense and bias wires are laminar foils which are either bonded or printed on the frame sides of corners and are electrically insulated from the sides and the corners. The frame sides are shaped to permit direct wave or dip soldering between terminals on adjacent core plane frames. The ground plate is located in the interior area defined by the frame sides and corners and is attached to either the frame sides or the corners. The magnetic core matrices are positioned on at least one surface of the ground plate.

Figure 2:
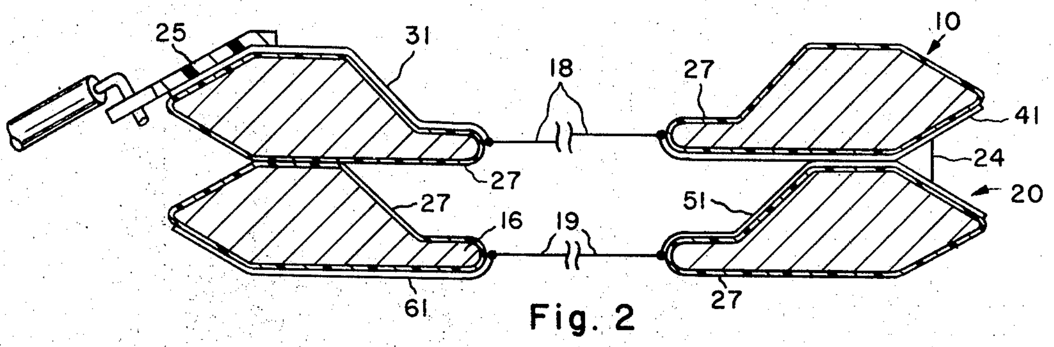
Figure 3:
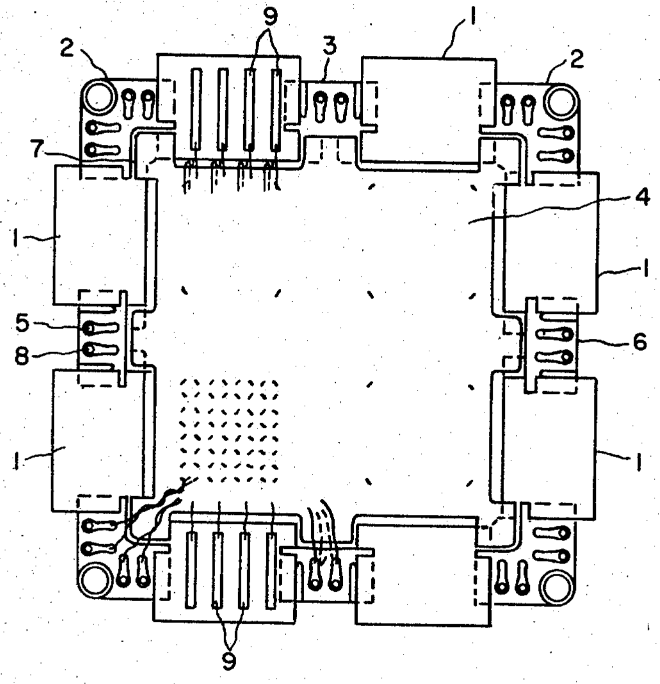

The invention will be described in greater detail with reference to a preferred embodiment thereof illustrated in the accompanying drawings in which:

FIG. 1 shows a perspective view of a pair of stacked core plane frames according to the invention, FIG. 2 shows the interconnection or drive wires between adjacent core plane frames, and FIG. 3 shows a plan view of a core plane frame having a plurality of mats and a ground plate.

Referring to the drawing, particularly FIG. 1, there is shown a core plane frame 10 comprising frame sides 1, corner members 2 and a core matrix 11. The plane frame 10 is shown stacked on a second core plane frame 20 to form a partial memory array.

The core matrix includes X and Y directional drive lines which are connected to terminals 9 to corresponding frame sides 1. A magnetic core 3 is located at the intersection of each of the X and Y drive wires. Sense 21 and bias 22 wires also pass through the cores along a diagonal path and a path parallel to either the X or Y drive wire respectively.

The corners 2 include a pair of legs 12 and 13 which are connected at right angles to one another. In the embodiment illustrated, the corners are die cast aluminum. A pair of projections 5 and 8 extend from the legs 12 and 13 respectively. The projections serve as sense 5 and bias 8 connecting terminals. Each corner 2 and hence each projection is covered by an insulating film which is bonded to the metal in a known manner. A layer of copper is deposited over and adjacent to the projections to provide a conductive foil terminal which is electrically insulated by the film from the corner 2. Sense 21 and bias 22 wires are soldered to the terminals 5 and 8 respectively and form part of the core matrix 11. The external sense and bias connections are attached directly to the terminal projections. Projections are utilized as connection points in order to obviate the break down of the insulation between the conductive foil and the metal corner which normally occurs when the connection terminal for receiving a wire is defined by an aperture having a conductive foil and insulating film on the surface adjacent the one end of said aperture.

A pair of aligned apertured bosses 15 are attached to the upper and lower surfaces of the legs 12 and 13. A boss 15 which is part of the core plane frame 20 abuts the lower boss 15 on the core plane frame 10. The core plane frames which form the memory array are connected by a bolt (not shown) which passes through the apertures in the bosses of the core plane frame.

A ground plate support 7 extends from the lower surface of the corner 2. In this embodiment the ground plate support 7 serves two purposes; the first is to locate a ground plate 4 on the core frame and the second is to position the frame sides 1 with respect to the corners 2. The ground plate 4, see FIG. 3, is not required in all applications, it is used in applications where it is necessary to support the core matrix if the core matrix is subjected to high vibration, to provide an excellent heat sink where heat transfer from the core matrix 11 is a consideration and to provide a ground reference for the magnetic cores.

Four frame sides 1 are connected to the legs 12 and 13 of each of the corners 2 to form a rectangular core plane frame. The sides 1 are fabricated by die casting or extruding aluminum. The frame sides 1 are slotted on each end to receive the leg portions of the corners. In the illustrated embodiment, the frame sides 1 are bonded to the corners 2 at the leg-groove connections.

A multiplicity of drive line terminals 9 are attached to each of the frame sides. The frame sides are covered with an insulating film, for example, aluminum oxide. Each terminal 9 includes a layer of copper foil deposited on the insulating film thereby insulating the conducting copper foil from the frame side. The number of terminals on a frame side 1 corresponds in number to the number of drive wires of the core matrix normal to the side. One-half of the terminals 9 are located on the upper surface of the frame side with the other half being located on the lower surface. The terminals on each surface are positioned to receive every other drive line. All of the X and Y directional drive lines of core plane frame 10 are connected to the corresponding X and Y directional drive lines of core plane frame 20, thus the above described positioning of the terminals facilitates the interconnection of drive wires between adjacent core planes.

A description of a connection between corresponding drive wires on core plane frame 10 and on core plane frame 20 will serve to illustrate how all of the inter-plane frame connections are accomplished.

FIG. 2 shows a first drive wire 18 on core plane 10 which extends from a terminal 31 on the upper surface of frame side on the left to a terminal 41 on the under surface of the opposing frame side. A second drive wire 19 on core plane 20 in the same vertically extending plane as the first drive wire extends from a terminal 51 on the upper surface of the frame side to a terminal 61 on the lower surface of the frame side. The thin layers of insulation 27 on each of the frame sides insulate the frame sides from one another; however, adjacent terminals abut as shown by terminals 41 and 51. The outer surfaces of the frame sides are bevelled or tapered and the terminals include extensions over the bevelled surfaces. A soldered connection 24 is made between the abutting terminals at the bevelled surfaces. The frame sides 1 include a thin section 16 to which the drive wires are connected. This reduced section permits connection of the drive lines to terminals positioned on upper and lower surfaces without requiring angular misalignment with respect to a horizontal plane of the drive wires. The drive wires which are both parallel and laterally adjacent to drive wire 18 in core plane frame 10 are connected to a corresponding drive wire in core plane frame 20. The connection between these drive wires will occur at the frame sides opposite the terminals 41 and 51.

Thin film Mylar printed circuit drives 25 are attached to the drive line terminals on the uppermost and lowermost core plane frames. The use of the Mylar printed circuit drives plus the soldered connection between the drive line terminals on adjacent core plane frames eliminates the need for a separate terminal frame.

FIG. 3 shows an alternative embodiment of a core plane frame according to the invention. Four core matrices 11 are incorporated in the core plane frame. The corners 2 are identical to the corners 2 shown in the first embodiment. The frame sides in core plane frame 20 are identical in cross-section to the frame sides of core plane frame 10 but may vary in length. Since a plurality of additional terminals for sense and bias connections are necessary, a joint member 6 is inserted between each of the two adjacent linearly aligned frame sides which constitute a single side of the core plane frame. A pair of projections 5 and 8 extend from both the upper and lower surfaces of the joint member. The projections are covered with an insulating film and a conductive copper layer to form terminals in the same manner as described for the terminal projections on the corners. The sense and bias connections are attached to these terminals. The connection between the frame sides 1 and the joint 6 is the same as the connection between the corners 2 and the frame sides 1.

The above cited embodiments are intended as exemplary only, and while I have described my invention with a specific application and embodiment thereof, other modifications will be apparent to those skilled in the art without departing from the spirit and scope of the invention as defined by the appended claims.

What is claimed is:

1. A memory plane frame assembly for supporting a core matrix and having interchangeable components, said frame comprising at least four corner members, at least four frame side members adapted to be interchangeably connected with the corner members to form a closed frame periphery, a core matrix located within the frame periphery and having respective directional drive wires connected to each of two opposed frame members, means integral with the frame member for conductively interconnecting the drive wires of two adjacently stacked frames, and means within the frame assembly for providing added stability to the matrix and for dissipating the heat generated by the cores, said frame side members including an insulating layer circumscribing said member and insulating adjacently stacked members, terminals for the drive wires formed respectively on the alternate upper and lower surfaces of the frame members, said terminals being in abutting relationship with each other when the frames are in the stacked position and serve to interconnect the drive wires of two adjacent matrices.

2. A memory plane frame assembly as claimed in claim 1 wherein the means for providing the added stability to the matrix and for dissipating the heat generated by the cores comprises a plate support attached to the corner members and extending interiorly into the frame periphery, and a heat conducting ground plate positioned on the supports and lying adjacent the matrix.

3. A memory plane frame assembly as claimed in claim 2 for supporting a plurality of matrices in one plane comprising at least four corner members, six frame side members, connected to the corner members and a joint member inserted between each of two adjacent linearly aligned frame side members.

4. A memory plane frame assembly as claimed in claim 3 wherein the corner and side members are aluminum and covered with an insulating layer of aluminum oxide, and the terminals are formed of copper foil.

References Cited

UNITED STATES PATENTS

| | | | |
|---|---|---|---|
| 3,178,802 | 4/1965 | Foreman | 340—174X |
| 3,209,336 | 9/1965 | Erikson et al. | 340—174 |
| 3,221,285 | 11/1965 | Jackson et al. | 340—174X |
| 3,328,781 | 6/1967 | Robey, Jr., et al. | 340—174 |
| 3,017,615 | 1/1962 | Smith et al. | 340—174 |

STANLEY M. URYNOWICZ, Jr., Primary Examiner